United States Patent [19]

Pinter

[11] 4,083,434
[45] Apr. 11, 1978

[54] BRAKE DISC WITH ANTI-OXIDATION PERIPHERAL COVERING

[76] Inventor: Henry J. Pinter, 130 W. Vine St., Alliance, Ohio 44601

[21] Appl. No.: 680,588

[22] Filed: Apr. 26, 1976

[51] Int. Cl.$^2$ ............................................. F16D 65/12
[52] U.S. Cl. ............................ 188/73.2; 188/218 XL; 192/70.2; 192/107 R
[58] Field of Search .......... 188/73.2, 218 XL, 250 G, 188/251 A; 192/107 M, 107 R, 70.14, 70.2

[56] References Cited

U.S. PATENT DOCUMENTS

| 3,422,936 | 1/1969 | Marcheron | 188/218 XL |
| 3,613,851 | 10/1971 | Ely et al. | 192/107 R |
| 3,650,357 | 3/1972 | Nelson et al. | 188/73.2 X |
| 3,891,066 | 6/1975 | Anderson | 188/218 XL X |
| 3,972,395 | 8/1976 | Jannasch et al. | 188/251 A |

*Primary Examiner*—George E. A. Halvosa

*Attorney, Agent, or Firm*—Reese Taylor

[57] ABSTRACT

An improved disc brake member is disclosed wherein the periphery of the usual carbon or graphite disc is covered with a metallic covering member which is secured thereto by axially extending pins which are pressed in place and then welded to the covering member. The invention also includes constructing the covering member in a number of segments, with clips being interposed beneath the ends of the segments so that the longitudinal ends of each segment can be spaced from the longitudinal ends of the next adjacent segment. In this fashion, a complete covering of the critical area of the brake member is achieved, while expansion due to heat build up is permitted. Further modifications include recessing the covering member to present flush planar side surfaces, and fusing the pin itself into the grain structure of the disc.

3 Claims, 8 Drawing Figures

BRAKE DISC WITH ANTI-OXIDATION PERIPHERAL COVERING

BACKGROUND OF THE INVENTION

This invention relates generally to disc brakes and the stators and rotors used therein, and in particular relates to a means of protecting certain surfaces thereof against oxidation and deterioration due to heat build up. It should be noted, however, that while the invention is illustrated and described with regard to disc brakes and the components therefor, it is believed that the same would have equal application in other areas in which heat build up and friction are problems; and, therefore, the invention is not intended to be necessarily limited to the brake field.

DESCRIPTION OF THE PRIOR ART

Originally, disc brakes for use in high stress conditions such as on aircraft were constructed of steel. However, carbon or carbon composites have been developed for use in this environment, because carbon or graphite presents advantages in weight, durability, smoother operation, and capability of reuse after a maximum energy stop, for example.

The disc brakes in question are usually full disc brakes, wherein pairs of full discs rub against each other with full circle contact. One disc is stationary and called the stator and keyed to the torque tube or axle, while the other disc is a rotating member keyed to the wheel and called the rotor.

Difficulties have encountered, however, with use of brakes of this nature in that the severe heat build up encountered while the brake is being applied will cause oxidation of the disc material and a consequent deterioration and destruction of the brake, necessitating replacement thereof after a relatively short period of use, which is expensive both in terms of the cost of the brakes themselves, and also in the "down time" of the aircraft.

The prior art has suggested a number of ways to overcome this; most involving capping the peripheral edges of the stator and rotor with materials having high tensile properties and good corrosion resistance at high temperatures. Most of the prior designs, however, fail to completely cover the peripheral surface, thereby leading to oxidation of the uncovered areas. Examples of this art may be seen in Crossman, et al, U.S. Pat. No. 3,757,907, and Cook, et al, U.S. Pat. No. 3,800,392.

Additionally, most of the prior art known to applicant involves the use of rivets which are pre-stressed to hold the covering or capping piece on the disc itself. The high heat build up encountered during operation of devices of this type is such that the rivets will become unstressed and the covering member will become loose, with a consequent deterioration and destruction of the disc itself.

The present invention is intended to overcome these difficulties.

SUMMARY OF THE INVENTION

It has been discovered, therefore, that a standard composite disc, such as is conventionally used, made of carbon or graphite can have its life prolonged and performance improved by providing a covering plate or member made of a material having high tensile property and good corrosion resistance at high temperatures such as, for example, titanium or a titanium alloy.

It has further been discovered that the integrity of the connection between the covering member and the disc itself can be enhanced by drilling slightly undersized holes through the walls of the covering member and through the thickness of the disc and then pressing slightly oversized pins of the same material as the covering member into these holes following which the pins are welded to the covering member to form the finished product.

While in many instances a full covering of the disc periphery in this fashion is acceptable, it has also been found that in some cases the heat build up is such that a certain degree of expansion will take place. Accordingly, it has been discovered that if a plurality of radially extending notches are provided and covered with a clip and pin in the same fashion as just described, that the covering plate itself can be broken into a plurality of segments which are spaced from each other in the area of the clips. In this fashion, the advantages of a full covering of the peripheral surface can be achieved while still allowing for some distortion due to the heat build up in the disc during operation.

It has also been found that improved design properties can be achieved in some instances by providing a recess in the disc and then applying the covering member so that the planar side surfaces of the disc are smooth and uniform. This reduces the width of the assembled disc and provides for improved air flow over the surfaces of the disc and covering member for cooling purposes.

Finally, in some instances it has been found desirable to actually fuse the pin material into the grain structure of the disc and fill in the holes in the covering member with weld material to hold the covering member onto the disc.

Accordingly, production of an improved disc member of the character above described becomes the principle object of this invention, with other objects thereof becoming more apparent upon a reading of the following brief specification, considered and interpreted in view of the accompanying drawings.

OF THE DRAWINGS

BRIEF DESCRIPTION OF THE PREFERRED EMBODIMENTS

Figure 1:
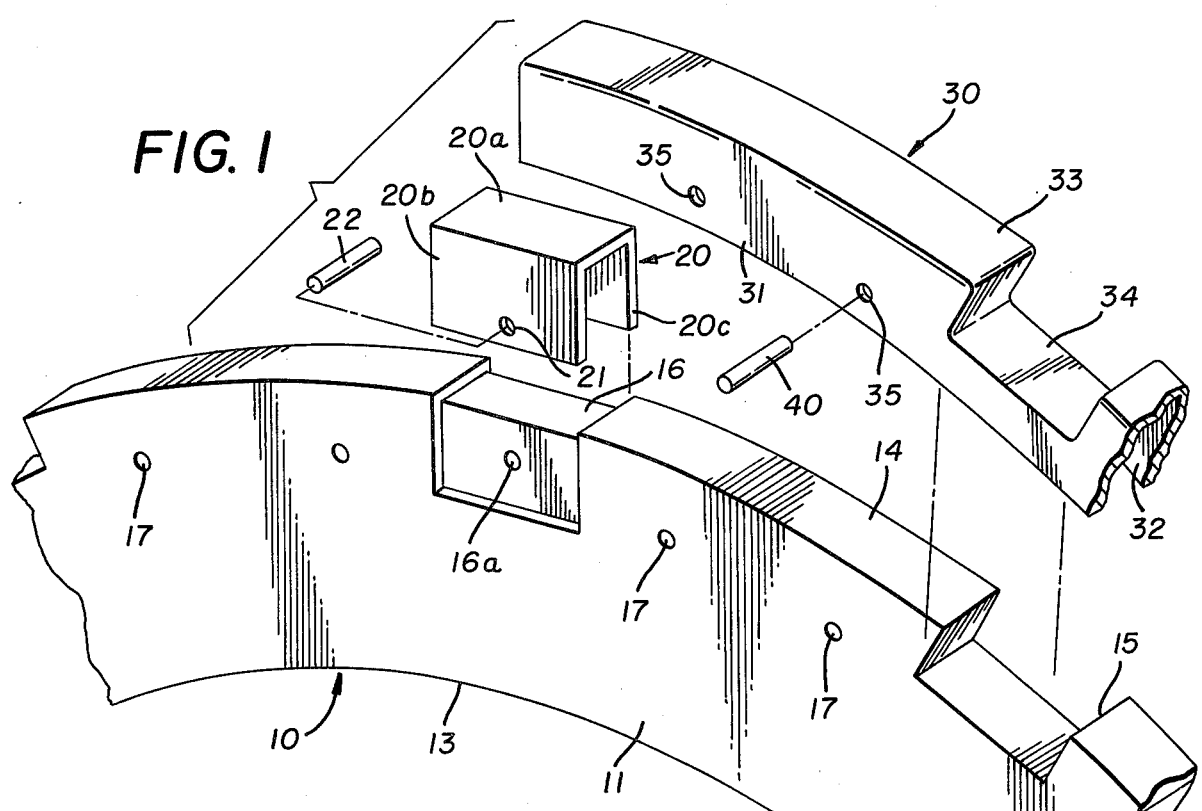
FIG. 1 is an exploded perspective view showing the clip and covering plate in unassembled condition.

Referring first then to FIG. 1, it will be noted that the disc, generally indicated by the numeral 10, which is shown only partially in FIG. 1, has opposed side walls 11 and 12, a bottom wall 13, and a top peripheral surface 14.

In this regard, it should be noted that while in the brake field the present invention has equal applicability to both a stator and a rotor, only the stator has been illustrated herein. Accordingly, while the invention is illustrated as covering the outer diameter of the stator, it has equal applicability to the inner diameter of the rotor.

Referring still to FIG. 1, it will be noted that the peripheral surface 14 of disc 10 has a plurality of conventional spline engaging notches 15, 15 extending radially inwardly thereof.

A second series of notches, generally indicated at 16, 16 is also provided for purposes which will be described.

In addition to the disc member 10, the invention also involves the clip 20 and the covering plate 30.

Clip 20 is a U-shaped member having a base 20a and depending legs 20b and 20c which have through holes 21, 21 therein, and is assembled by means of the pin 22 which will be described more fully below.

The covering plate 30 is a metallic member having a configuration complemental to the peripheral surface 14 of the disc 10, and is also U-shaped having opposed legs 31 and 32 and a top wall 33, with through holes 35, 35 being provided therein. A plurality of depressions 34 are provided in the covering member 30 spaced so as to correspond with the spline engaging notches 15, 15 of the disc 10.

In assembling and preparing a typical disc 10, te covering plates 30, 30, which normally are made of a commercial pure titanium or titanium alloy having a high tensile property and good corrosion resistence at high temperatures, are machined to conform to the diameter and configuration of the disc member 10 involved.

It should be noted here that while certain materials are described herein, it would be possible in other uses where lower temperatures are invovled to utilize carbon steel, stainless steel, etc. In the aircraft brake area, however, materials having the properties bove noted have been found to be desirable.

Figure 2:
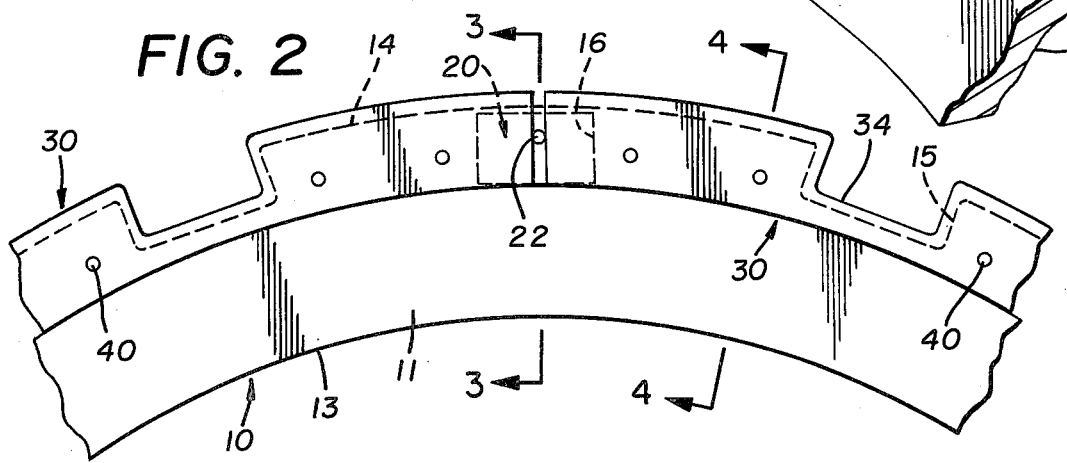
FIG. 2 is a side elevational view of a portion of the disc, showing the clip and plate in position.
Figure 3:
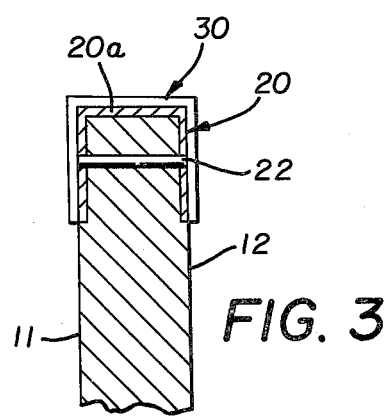
FIG. 3 is a sectional view taken along the line 3—3 of FIG. 2.
Figure 4:
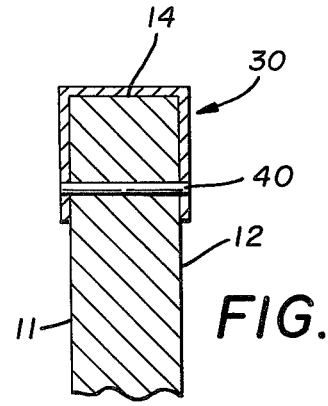
FIG. 4 is a sectional view taken along the line 4—4 of FIG. 2.

In the preferred form of the invention, the standard disc 10 has a plurality of radially extending pockets or notches 16, 16 machined into the peripheral surface in addition to the conventional spline notches 15, 15, as shown in FIGS. 1 and 2. A hole 16a is then provided through the disc, as clearly shown in FIG. 1, in the area of each notch 16. This hole is slightly undersized with regard to the outer diameter of a pin 22. The clip 20 is provided with holes 21, 21, as noted, and its depending legs are then placed in position in the pocket 16, and the pin 22 is pressed into place and its ends are welded to the legs 20b, 20c of the clip.

Following this, the covering member 30 which in this form of the invention consists of a plurality of identical segments is placed on the peripheral surface 14, as shown in FIG. 2, with depressions 34, 34 seating in spline engaging noches 15, 15. Following this, the holes 35, 35, and 17, 17 being aligned, the pins 40, 40 will be pressed into place, as described above with regard to pins 22, 22 and welded to legs 31, 32 of covering plate 30.

In this form of the invention, it will be noted that adjacent segments (see FIG. 2) of the covering means 30 are spaced from each other in the area of the clip 20. In this fashion, some expansion due to heat build up is provided for without deterioration of the disc or damage thereto. This is achieved without sacrificing the full covering characteristics of a complete one-piece disc by virtue of the fact that the clips will cover the area between the ends of adjacent segments and protect them as well.

Figure 5:
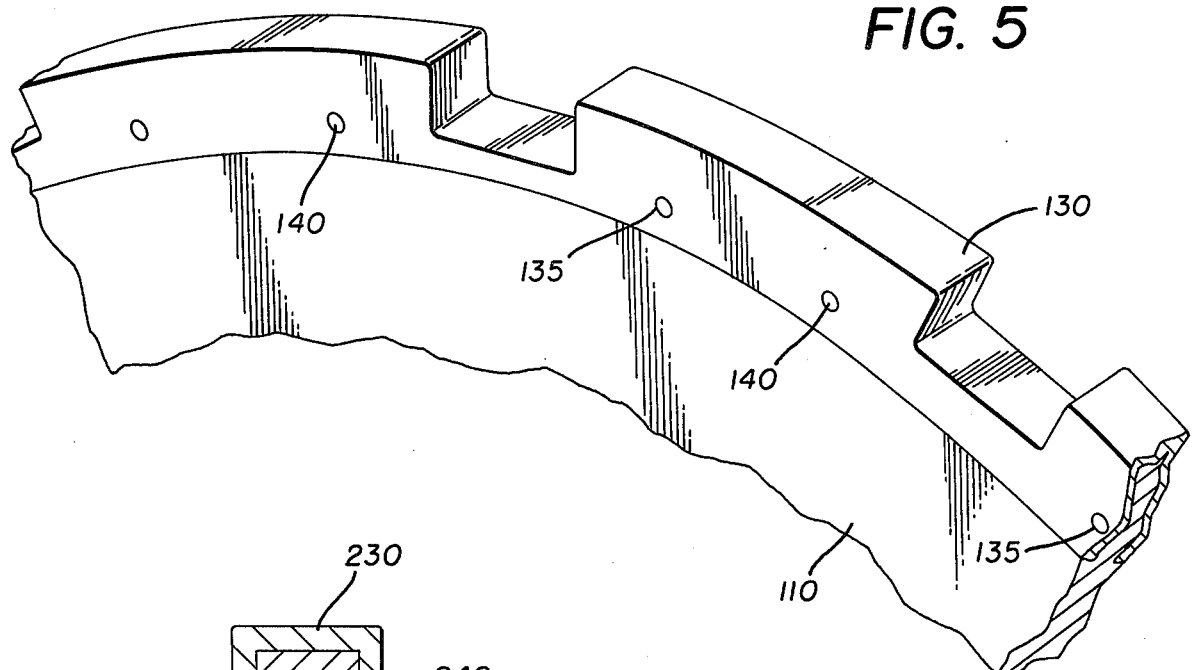
FIG. 5 is a view similar to FIG. 2, showing a single piece covering member.

In the modification of FIG. 5, the standard disc 110 which is normally of carbon or graphite is provided, and the covering member 130 is of one piece and capable of covering the entire periphery of the disc 10 and held in place by fixturing means (not shown).

The holes 135, 135 in the covering member, and 117, 117 of disc 110 are then aligned. As noted with regard to the form of the invention shown in FIGS. 1 and 2, these holes are drilled slightly undersized with respect to the diameter of the pins 140. Once the holes have been drilled, the pins 140, 140 are pressed into the holes.

After the pins have been placed in the holes, they are welded to the covering member 130 to form the finished product.

Figure 8:
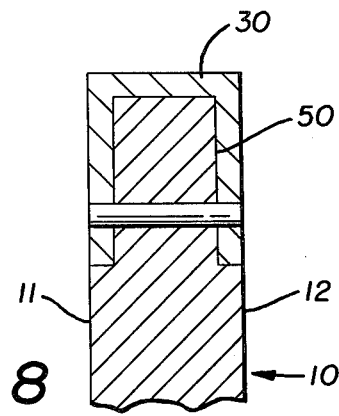
FIG. 8 is a sectional view showing a further modification of the invention.

A further modification can be seen in FIG. 8 wherein an annular recess 50 has been provided adjacent the periphery of the disc 10. A covering member, such as either segmented members 30, 30 (with clips 20, 20) or unitary member 130, can then be affixed as described above, with the outer planar surfaces of members 30 or 130 being in co-planar relationship with side walls 11 and 12 of disc 10. This reduces the overall width of the assembled device and provides for smoother air passage over the disc for improved cooling.

Figure 6:
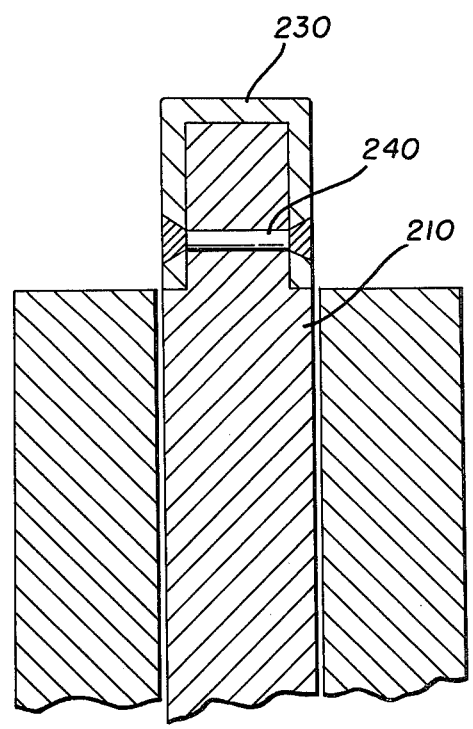
FIG. 6 is a sectional view showing a modified form of the invention.
Figure 7:
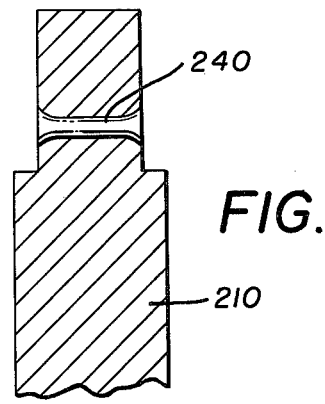
FIG. 7 is a view similar to FIG. 6 showing the pin fused into the grain structure of the disc.

FIGS. 6 and 7 show a still further modification wherein pin 240 is heated and actually fused into the grain structure of the disc. The covering member 230 has countersunk holes which are then filled with weld material, and the cover member can be secured to the disc in this fashion. Alternatively, a hole could be drilled in the pin and other fastening means utilized.

The modification of FIGS. 6 and 7 shows fusing of the pin 240 to the disc 210 only adjacent its ends. However, the fusion could be accomplished through the length of the pin. In either version, the fusion excludes any air from between the pin and the disc and avoids deterioration of the disc.

While a full and complete description of the invention has been set forth as provided by the patent statutes, it should be understood that modifications can be resorted to without departing from the spirit hereof or the scope of the appended claims.

Thus, as noted above, while the invention has been illustrated and described in connection with a disc member for disc brakes, it is believed apparent that it is essentially a friction device and could be employed in other uses such as clutches, etc., wherein the same heat problems are encountered; and, therefore, the invention is not intended to be limited strictly to one particular field of use.

Furthermore, while certain materials have been described herein, they are described for purposes of illustration only; and the invention is not intended to be limited to a specific material.

Also, while the various covering members have been illustrated in connection with the outer diameter of a stator, it should be understood that the invention has equal applicability to the inner diameter of a rotor as well.

What is claimed is:

1. A friction member, compising:
   A. a rigid disc having a peripheral surface and opposed planar faces;

B. said peripheral surface having a first series of radially extending spline engaging notches extending between said planar faces of said disc arranged in spaced relationship therealong;

C. U-shaped anti-oxidation plate means covering said peripheral surface and havinga configuration complemental to the configuration of said peripheral surface of said disc and said spline engaging notches and overlying a potion of said planar faces of said disc;

D. a plurality of pines engaging the legs of said plate means, penetrating said disc to secure said plate thereto and being fused into the grain structure of said disc;

E. said peripheral surface having a second series of non-torque receiving notches therein spaced between at least some of the notches of said first series and extending radially inwardly from said peripheral surface and axially inwardly a distance less than the axial thickness of the plate from said planar faces;

F. a plurality of U-shaped clips, one received in each of said second series of notches to cover the peripheral and side surfaces of the material remaining in said second series of notches; and G. a plurality of pins securing said clips to said second series of notches; and H. said plate means including a plurality of plate sections with the ends of adjacent sections partially overlying said clips and being spaced from each other adjacent said clips.

2. The friction member of claim 1 wherein
A. said opposed planar faces of said disc are axially undercut adjacent the periphery thereof; and,
B. said overlying portion of said anti-oxidation plate means being received in the undercut areas of said disc.

3. The friction member of claim 1 wherein said second series of notches are alternately spaced between said first series of notches.

* * * * *